UNITED STATES PATENT OFFICE.

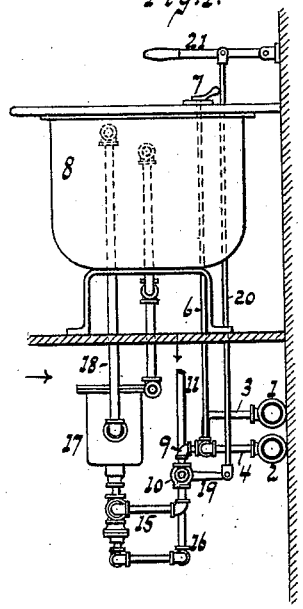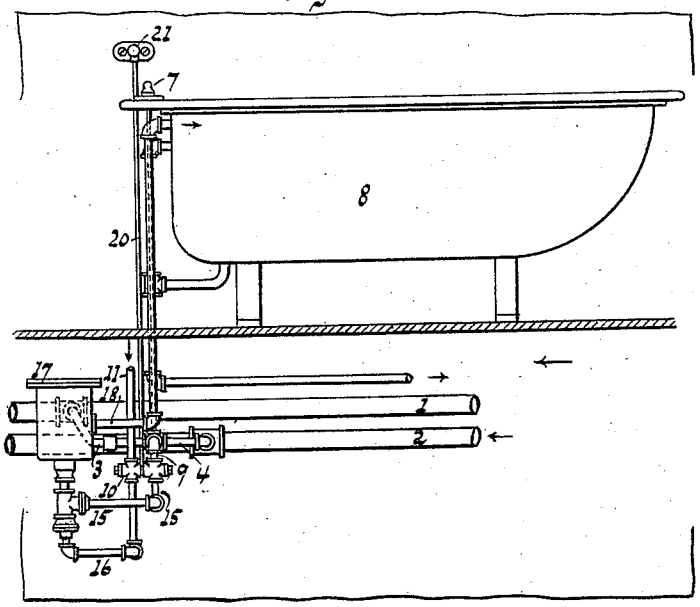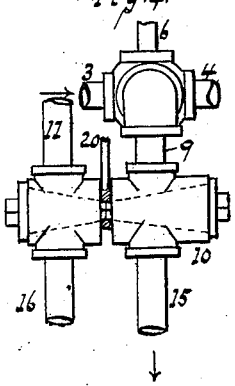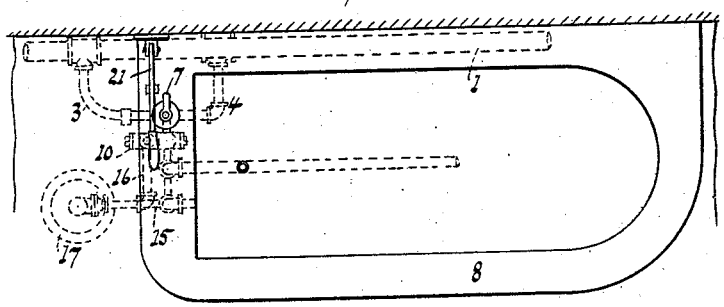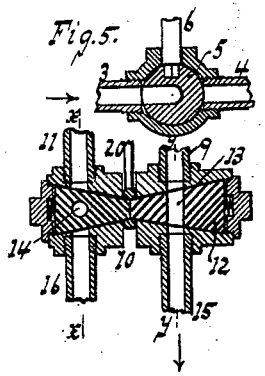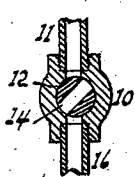

JOHN GEORGE HERMES, OF MOUNT VERNON, NEW YORK.

APPARATUS FOR SUPPLYING AND HEATING WATER.

SPECIFICATION forming part of Letters Patent No. 576,846, dated February 9, 1897.

Application filed July 30, 1896. Serial No. 601,090. (No model.)

*To all whom it may concern:*

Be it known that I, JOHN GEORGE HERMES, a citizen of the United States, residing at Mount Vernon, in the county of Westchester and State of New York, have invented new and useful Improvements in Apparatus for Supplying and Heating Water, of which the following is a specification.

The object of this invention is to obtain a device or apparatus by which various feeds or supplies of water can be procured and by which the water can be heated or have its temperature regulated as desired; and the invention resides in the novel features of construction set forth in the following specification and claims, and illustrated in the annexed drawings, in which—

Figure 1 is a side elevation of a supply and heating apparatus. Fig. 2 is a front elevation of Fig. 1. Fig. 3 is a plan view of Fig. 2. Fig. 4 is a detail view of cocks or valves. Fig. 5 is a sectional view of a cock or valve for the water-supplies and of a cock or valve for water and steam supply. Fig. 6 is a section along $xx$, Fig. 5. Fig. 7 is a section along $yy$, Fig. 5.

Taking, for example, sea-going vessels or yachts, it is at times found desirable to have on board a bath-tub or lavatory capable of being supplied with salt water or with fresh water, according to desire, as also to have such water regulated as to its temperature. In the drawings are shown two conduits or supplies, of which, for example, supply 1 may communicate with a fresh-water supply, such as a tank or condenser, while supply 2 may communicate with a salt-water supply, as by being led overboard or out below the water-line of a sea-going vessel. Supply 1 has a discharge 3, and supply 2 has a discharge 4. These discharges lead to the housing of a two-way cock or valve 5, Fig. 5, which can be operated by stem 6, having handle 7, conveniently located, as, for example, in proximity to a bath-tub or basin 8. By suitably turning or setting cock 5 to communicate with conduit 1 or 2 fresh or salt water, as desired, can be allowed to pass through cock 5 to the discharge 9. The discharge 9 leads to a valve-housing 10, into which also leads a heat-supply, such as a steam-pipe 11. The housing 10 contains a plug or cock or a compound plug or cock 12, with ways 13 and 14. These ways may be called "alternating," being so arranged or shaped or inclined to one another, as seen in Figs. 6 and 7, that one way may be closed to shut off steam while the other way may be open for the passage of water, or vice versa, and a turn of plug 12 in one direction or another will close or partly close one of the ways 13 or 14 while opening or partly opening the passage or flow through the other way. By thus having a flow of water through passages 9 13 15 while having no flow of steam through passages 11 14 16 the water can be left cold, as will presently appear. On the other hand, by having a flow of water and steam through the ways 13 and 14 the water will be more or less heated.

The passages or conduits 15 and 16 lead to a mixing-chamber 17, where the water and steam flowing together when required, as noticed, are suitably mixed, or, in other words, the steam can suitably heat the water. From the mixing-chamber 17 the conduit 18 leads the water to the tub or receptacle 8.

The cock or plug 12 can be actuated by lever or rod 19, Fig. 1, connecting by link 20 with handle or lever 21, suitably located within reach.

In stating that the device is useful on sea-going vessels it is of course understood that the use of the device is not limited to such vessels, as the device may be useful in other localities. Taking, for example, lake or river vessels, the outboard leading conduit 2 may be serviceable when the lake or river water is serviceable, while if such outboard water should be muddy or undesirable conduit 1 may be used to obtain a suitable supply. Neither is the device limited to use in vessels, as it may be serviceable elsewhere, as, for example, in bathing establishments, sanitariums, or other localities where various supplies of water, liquids, or baths may be desired.

The mixing-chamber 17 may be an apparatus of suitable construction—for example, such as described in United States Letters Patent No. 532,374, granted me January 8, 1895, or of other serviceable form.

What I claim as new, and desire to secure by Letters Patent, is—

1. A plurality of supply-conduits combined with a discharge for the conduits, an alternating cock for the discharge, a heat supply or conduit, and an alternating cock for the heat-supply and discharge substantially as described.

2. A plurality of supply-conduits combined with a discharge for the conduits, an alternating cock for the discharge, a heat supply or conduit, an alternating cock for the heat-supply and discharge, and a mixing-chamber made to communicate with the discharge and heat-supply, substantially as described.

In testimony whereof I have hereunto set my hand in the presence of two subscribing witnesses.

J. GEORGE HERMES.

Witnesses:
WM. C. HAUFF,
CHAS. E. POENSGEN.